United States Patent [19]

Bien et al.

[11] 4,006,978
[45] Feb. 8, 1977

[54] MOTION PICTURE CAMERA WITH MOTOR CONTROL CIRCUIT HAVING DECREASED POWER CONSUMPTION

[75] Inventors: Franz Bien; Karel Pustka, both of Munich; Eduard Wagensonner, Aschheim, all of Germany

[73] Assignee: AGFA-Gevaert, A.G., Leverkusen, Germany

[22] Filed: Aug. 22, 1975

[21] Appl. No.: 607,055

[30] Foreign Application Priority Data

Aug. 30, 1974 Germany .......................... 2441544

[52] U.S. Cl. ................. 352/174; 352/169
[51] Int. Cl.² .......................................... G03B 1/00
[58] Field of Search .......... 352/174, 178, 175, 176, 352/177, 169

[56] References Cited

UNITED STATES PATENTS

| | | | |
|---|---|---|---|
| 3,598,480 | 8/1971 | Kubota | 352/178 |
| 3,790,264 | 2/1974 | Heinrich | 352/174 |

*Primary Examiner*—Monroe H. Hayes
*Attorney, Agent, or Firm*—Michael J. Striker

[57] ABSTRACT

A pair of contacts of a relay energizes the driving circuit for the film drive motor when closed. The coil operating the contacts is connected in series with the emitter of a transistor whose base is connected to the battery upon closing of the camera activating button. Zener diode connected between the base of the transistor and the relay contacts. Closing of the contacts thus energizes the motor driving circuit and also connects the Zener diode into the base-emitter circuit of the transistor, thereby decreasing the base voltage and increasing the emitter-collector resistance so that current through the coil is decreased to the holding current.

10 Claims, 3 Drawing Figures

MOTION PICTURE CAMERA WITH MOTOR CONTROL CIRCUIT HAVING DECREASED POWER CONSUMPTION

BACKGROUND OF THE INVENTION

This invention relates to a motion picture camera having an electromagnetic activating mechanism. In particular, it relates to cameras wherein a relay has a coil which, upon energization, closes a pair of contacts in the driving circuit of the motor advancing the film.

SUMMARY OF THE INVENTION

It is an object of the present invention to furnish a motion picture camera of the above-described type in which a reduction of the required power is achieved without a loss of reliability.

The present invention resides in a motion picture camera having film, a source of electrical energy, film drive means for advancing said film and relay means having contact means connected to said drive means and said source of electrical energy and a coil for operating said contact means to a state energizing said film drive means in response to a pull-in current flowing through said coil. Said relay means require a holding current substantially less than said pull-in current to maintain said contacts in said state energizing said film drive means. Further, the camera has energizing circuit means connected to said coil for furnishing said pull-in current to said coil upon external activation. The present invention is the improvement comprising additional circuit means connected between said contact means and said energizing circuit means for reducing the current through said coil to said holding current when said contact means are in said state energizing said film drive means.

In a preferred embodiment of the present invention, the energizing circuit means comprise a transistor having an emitter-collector circuit connected in series with said coil. Closing of an activating switch causes a voltage to be applied to the base of the transistor which causes the transistor to be fully conductive, thereby allowing the pull-in current to flow through the coil. When the relay contacts close, the additional circuit means, which in a preferred embodiment of the present invention, comprise a Zener diode, are connected to the base of the transistor. The voltage supplied by the Zener diode is such that the resistance of the emitter-collector circuit of the transistor increases to a value such that the holding current flows through the relay coil.

It is a further object of the present invention to allow it to be used in conjunction with special features of the motion picture camera. These features are to include circuits for effecting the exposure of a single frame, stop motion effects, title automation and film drive delay. For this purpose, a normally closed switch is provided in the circuit connecting the base of the transistor to the battery. The special feature circuits mentioned above are connected individually in parallel with said switch. The switch is coupled to the individual selector switches, each of which allows selection of one of the above-mentioned circuits by the photographer, so that it opens when one of the selector switches is closed.

In a preferred embodiment of the present invention, the above stages are decoupled from each other, both on their input and their output sides.

DRAWING PARAGRAPH

DESCRIPTION OF THE PREFERRED EMBODIMENT

Figure 1:
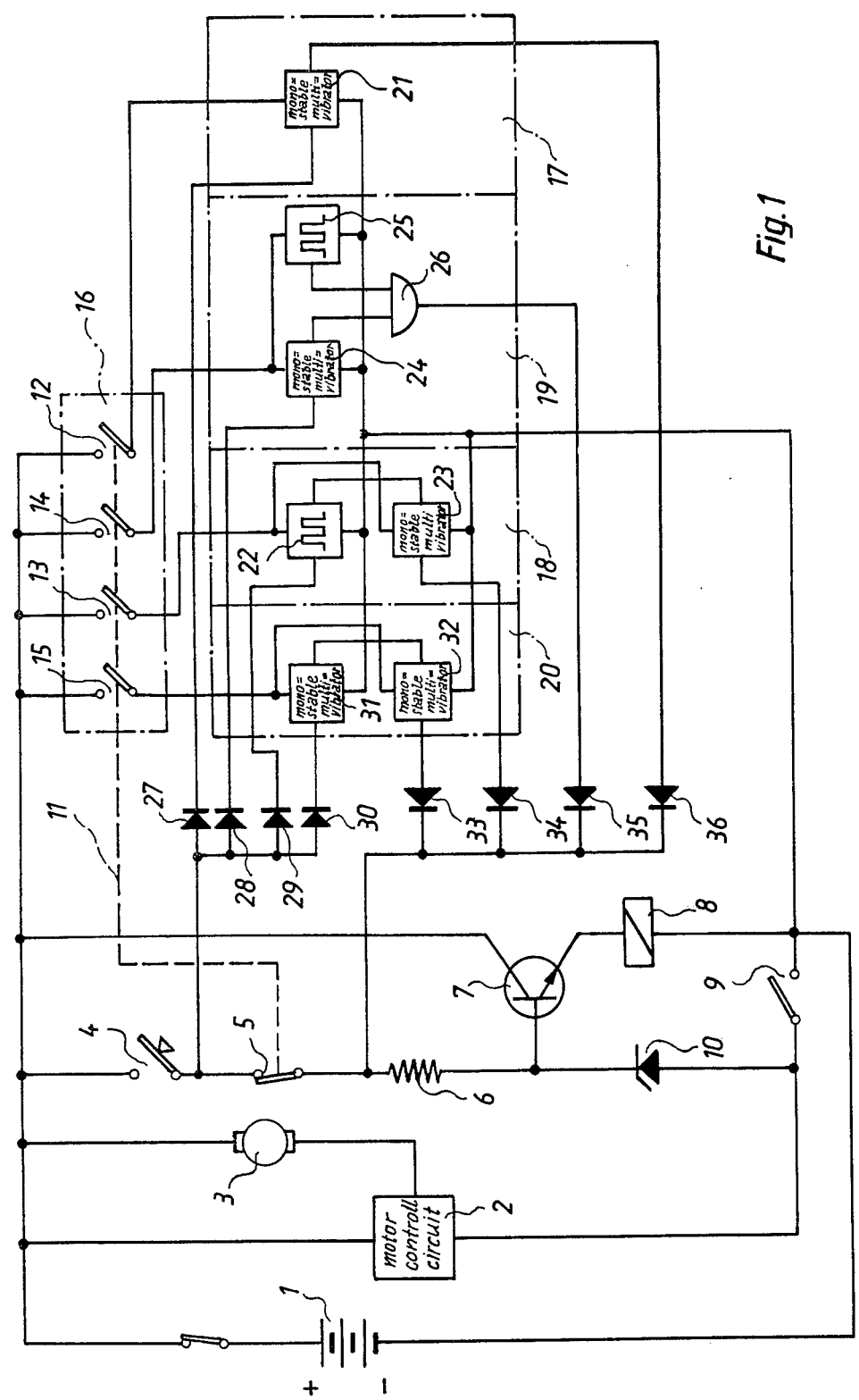
FIG. 1 is a schematic diagram of the circuit of the present invention as connected in a motion picture camera.

A preferred embodiment of the present invention will now be described with reference to the drawing.

In FIG. 1, reference numeral 1 denotes a battery, herein referred to as a source of electrical energy. A motor control circuit 2, shown in greater detail in FIG. 2, has an output connected to a DC motor 3. Motor control circuit 2 and motor 3 together constitute film drive means. An activating switch 4, herein referred to as a connecting means, connects the positive side of battery 1 to a normally closed switch 5. Switch 5 is in turn connected to a resistor 6 whose other terminal is connected to the base of a transistor 7. Transistor 7 is driven to the fully conductive state upon closing of switch 4. The collector of transistor 7 is connected through a further switch to the positive side of battery 1. A relay coil 8 is connected between the emitter of transistor 7 and the negative side of battery 1. A pair of relay contacts denoted by reference numeral 9 connects the anode of a Zener diode 10 to the negative side of battery 1. The cathode of Zener diode 10 is connected to the base of transistor 7. Zener diode 10 and resistor 6 together constitute a voltage divider. The value of resistor 6 is such that it serves both as a protective resistor for the base of transistor 7 and also as load resistor for Zener diode 10. When switch 9 is closed, the voltage applied by Zener diode 10 to the base of transistor 7 is such that it, decreased by the voltage drop across the base-emitter junction of transistor 7, serves as the required supply voltage for relay coil 8.

Switch 5 is connected by a coupling 11 to four selector switches 12, 13, 14, and 15, which together constitute a group of selector switches denoted by reference numeral 16. Selector switch 12 is connected to a stage 17 for effecting the exposure of single frames. Selector switch 13 is connected to a stage 18 for stop motion effects. Selector switch 14 is connected to a stage 19 for title automation, while selector switch 15 is connected to a film advance delay stage 20. Stage 17 is shown in greater detail in FIG. 3. It comprises a monostable multivibrator 21. The time that monostable multivibrator 21 is in the unstable state corresponds to the reciprocal of the frame frequency. Stage 18 comprises an astable multivibrator 22 whose output is connected to a monostable multivibrator 23. Astable multivibrator 22 has an adjustable frequency. Its output switches monostable multivibrator 23 to the unstable state. The time that multivibrator 23 remains in the unstable state corresponds to the reciprocal of the frame frequency. Stage 19 comprises a monostable multivibrator 24 and an astable multivibrator 25. The outputs of both multivibrators are connected to the inputs of the AND gate. The output pulse of astable multivibrator 25 reaches the output of AND gate 26 only while monostable multivibrator 24 is in the unstable state. Only when monostable multivibrator is in the unstable state does a positive voltage appear at its output. The frequency of astable multivibrator 25 is equal to the frame frequency while the time that monostable multivibrator 24 is in the unstable state may be varied. Usually, this time is chosen to allow four output pulses of astable multivibrator 25 to reach the output of AND gate 26.

Stage 20 comprises two monostable multivibrators 31 and 32, connected in cascade. The time that each of the multivibrators is in the unstable state is adjustable. When monostable multivibrator 31 switches back to the stable state, it switches monostable multivibrator 32 to the unstable state. When monostable multivibrator 32 returns to the stable state, the filming is terminated.

The operation of each of stages 17 through 20 is initiated by operation of switch 4. Switch 4 is connected through diodes 27, 28, 29 and 30 to the inputs of stages 17, 18, 19 and 20 respectively. The outputs of stages 17, 18 and 19, and 20 are connected to the anodes of diodes 33, 34, 35, and 36 respectively. The cathodes of all of these diodes are connected in common to the side of switch 5 which is connected to resistor 6.

If one of selector switches 12–15 is closed by the photographer, the subsequent closing of switch 4 causes the correct voltage to be applied at the correct time to the base of transistor 7 through the selected one of the programming stages 17–20.

Figure 2:
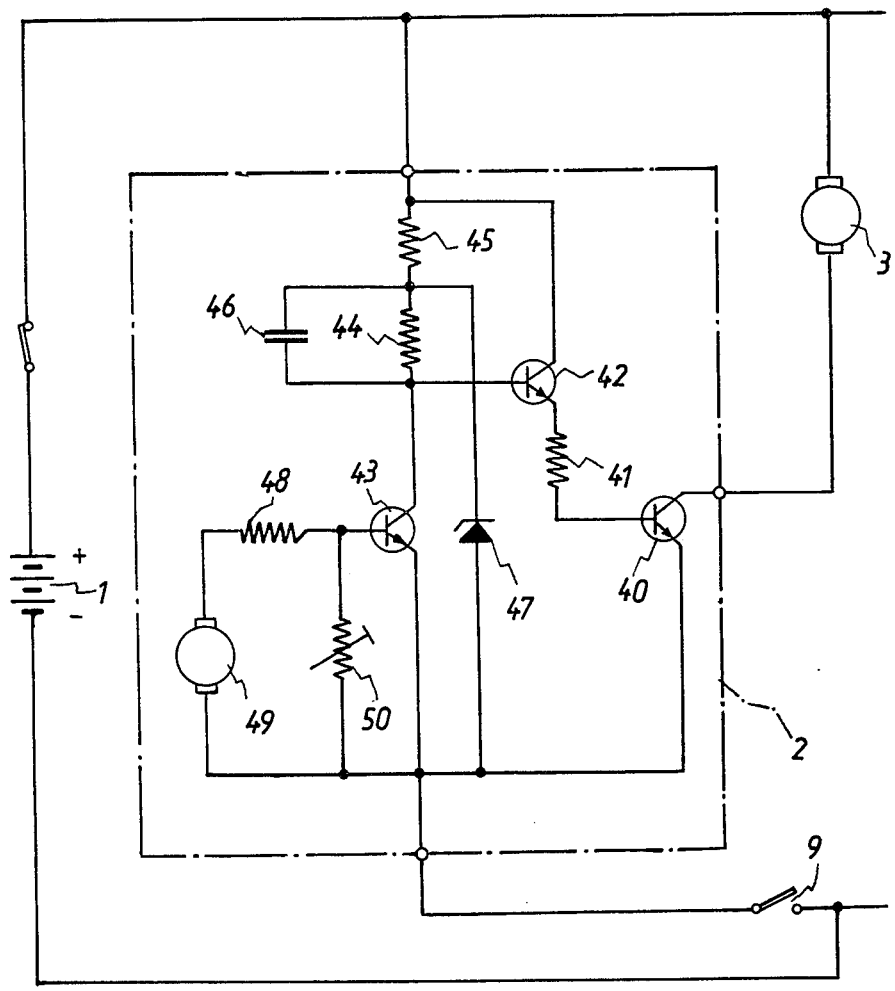
FIG. 2 shows the motor control circuit shown as Block 2 in FIG. 1.

FIG. 2 shows motor control circuit 2 in greater detail. It comprises an output transistor 40 to whose collector is connected the film drive motor 3. The base of transistor 40 is connected through a resistor 41 to the emitter of a transistor 42. The collector of transistor 42 is connected to the positive side of battery 1. The base of transistor 42 is connected to the collector of the transistor 43. Also connected to the collector of transistor 43 are resistors 44 and 45. A capacitor 46 is connected in parallel with resistor 44. A Zener diode 47 is connected in parallel with the series circuit including the emitter-collector circuit of transistor 43 and resistor 44. Zener diode 47 serves as a voltage stabilizer element. A tachometer 49 in series with a resistor 48 is connected in parallel with the base-emitter circuit of transistor 43. An adjustable resistor 50 is also connected in parallel with the emitter-base circuit of transistor 43. Tachometer 49 is coupled to motor 3 and furnishes a control voltage having an amplitude varying as a function of the speed of motor 3 to transistor 43. The collector current of transistor 43, and thus the base voltage of transistor 42, therefore vary as a function of the speed of motor 3. The base current of output transistor 40 also varies in dependence upon the emitter-collector current of transistor 42.

Figure 3:
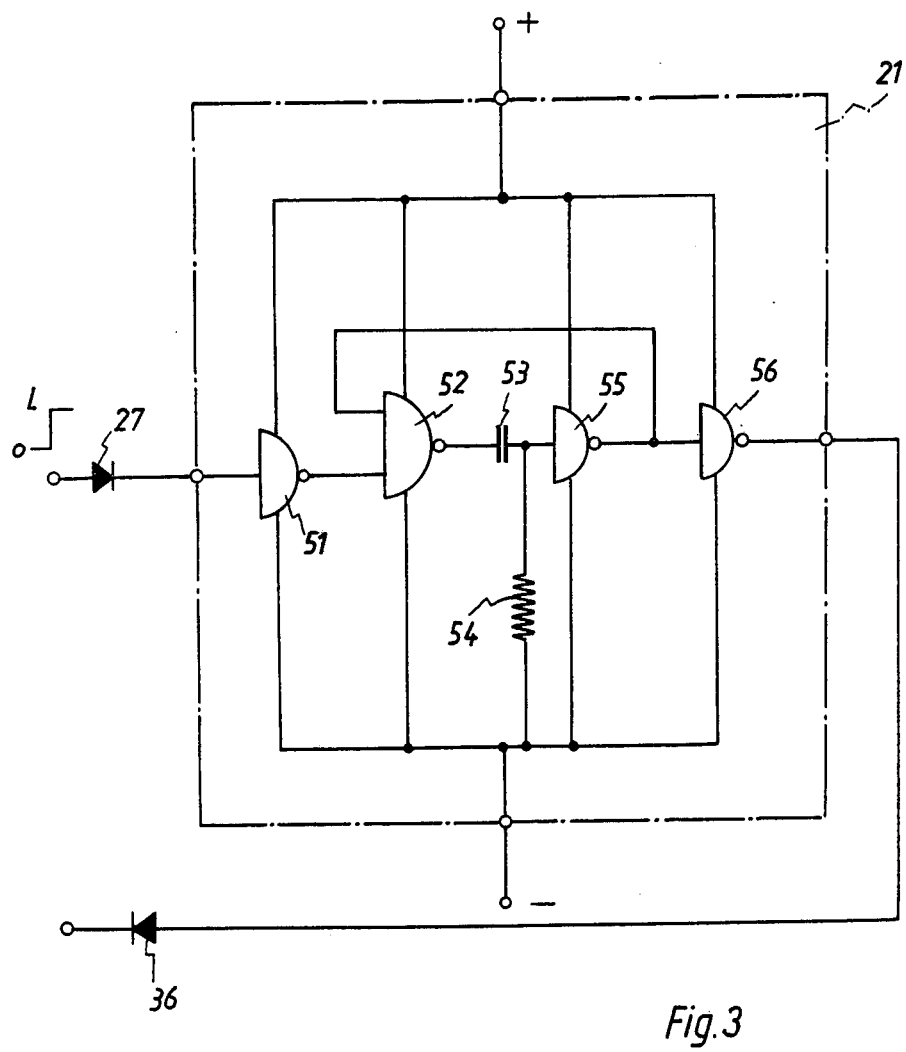
FIG. 3 is a circuit diagram of the single-frame exposure circuit shown as Block 21 in FIG. 1.

FIG. 3 shows monostable multivibrator 21. Diode 27 is connected to the input of an inverter 51, whose output is connected to one input of a NAND gate 52. The output of NAND gate 52 is connected to a timing capacitor 53 which, together with a resistor 54, determines the time that monostable multivibrator 53 is in the unstable state. Capacitor 53 is also connected to an inverter 55 whose output is connected to the other input of NAND gate 52. An output inverter stage 56 is connected to the output inverter 55. The output of inverter 56 is connected to the anode of diode 36. Before a positive voltage is applied to diode 27, a "0" potential is applied the input of inverter 55; therefore a "1" potential exists at the output of inverter 55. This causes the potential at the second input of NAND gate 52 to be a "1" potential. Since diode 27 is blocked, a "0" potential is present at the input of inverter 51, causing a "1" potential to be present at the first input of NAND gate 52. Thus, the output potential of NAND gate 52 is a "0" potential, as is the output potential of inverter 56. Only when a "1" potential is applied to the input of inverter 51 through diode 57 does the output potential of NAND gate 52 become a "1" potential. Capacitor 53 charges through resistor 54. The change in potential from "0" to "1" at the output of NAND gate 52 is transferred to the output of monostable multivibrator 21 and thereafter through diode 36 to the base of transistor 7.

Relay 8 is thus energized while monostable multivibrator 21 is in the unstable state and deenergized when monostable multivibrator 21 is in the stable state.

For stage 19, relay 8 is similarly energized when AND gate 26 has a "1" output. When switch 13 is closed, relay 8 is energized while monostable multivibrator 23 is in the unstable state and, if the photographer closed switch 15, relay 8 is energized while monostable multivibrator 32 is in the unstable state.

It is seen that by the present invention, the power consumption of relay 8 is decreased both during normal operation of the motion picture camera and when the camera is used for one of a number of special purposes.

What is claimed as new and desired to be protected by Letters Patent is set forth in the appended claims.

1. In a motion picture camera having film, a source of electrical energy, film drive means for advancing said film, relay means having contact means connected to said film drive means and said source of electrical energy and a coil for operating said contact means to a state energizing said film drive means in reponse to a pull-in current flowing through said coil said relay means requiring a holding current substantially less than said pull-in current to maintain said contact means in said state, and energizing circuit means connected to said coil for furnishing said pull-in current to said coil upon external activation, the improvement comprising additional circuit means connected to said contact means and said energizing circuit means, for reducing the current through said coil to said holding current when said contact means are in said state energizing said film drive means, wherein said energizing circuit means comprise connecting means for connecting said energizing circuit means to said source of electrical energy upon external activation, and variable impedance means having a controlled impedance circuit connected in series with said coil and a controlling circuit connected to said connecting means, said contact means and said additional circuit means, for controlling the current through said coil to said pull-in current prior to said operating of said contact means and to said holding current following said operating of said contact means, wherein said contact means comprise a single pair of contact connected to said film drive means, and said additional circuit means, wherein said variable impedance means comprises a transistor having an emitter connected to said coil and a base connected to said connecting means; and wherein said additional circuit means comprises a Zener diode connected between said base and said pair of contacts, where said camera further comprises at least one special effect circuit and at least one selector switch for connecting said special effects circuit to said source of electrical energy upon external activation; wherein said connecting means comprise a normally open switch connected to said source of electrical energy; further comprising a normally closed switch having a first contact connected to said normally open switch and a second contact connected to said base of said transistor, means for connecting said special effects circuit in parallel with said normally closed switch, and coupling means for coupling said normally closed switch to said selector switch in such a manner that said normally closed switch opens when said selector switch closes.

2. A motion picture camera as set forth in claim 1, wherein said means for connecting said special effects circuit in parallel with said normally closed switch comprise a first diode connected between the input of said special effects circuit and said first contact and a second diode connected between the output of said special effects circuit and said second contact.

3. A motion picture camera as set forth in claim 2, wherein said special effects circuit is a circuit for effecting a single frame exposure and comprises a monostable multivibrator having a time constant corresponding to the reciprocal of the frame frequency.

4. A motion picture camera as set forth in claim 3, wherein said camera further comprises a second, third and fourth special effects circuit, for, respectively, effecting a film drive delay, stop motion effects, and title filming; and wherein said second special effects circuit comprises a first and second monostable multivibrator connected in cascade, said third special effects circuit comprises an astable multivibrator and a monostable multivibrator having an input connected to the output of said astable multivibrator, and said third special effects circuit comprises an AND gate, a monostable multivibrator having an output connected to one input of said AND gate, and an astable multivibrator having an output connected to the second input of said AND gate.

5. In a motion-picture camera having film, a source of electrical energy, film drive means for advancing said film, relay means having contact means connected to said film drive means and said source of electrical energy and a coil for operating said contact means to an activated state energizing said film drive means in response to a pull-in current flowing through said coil, the coil of said relay means requiring a holding current substantially less than said pull-in current to maintain said contact means in said activated state, a controllable-impedance semiconductor element connected in the current path of the coil and having a control electrode for receipt of a control voltage determining the impedance of the element, energizing circuit means connected to said control electrode and operative upon external activation for furnishing to said control electrode a voltage such that the controllable-impedance semiconductor element becomes highly conductive and establishes the flow of the pull-in current through the coil and through the semiconductor element in the current path of the coil, and additional circuit means automatically operative after said contact means assumes said activated state for changing the voltage applied to said control electrode to a value causing said controllable-impedance semiconductor element to undergo an impedance increase lowering the current through said coil and through said element to the value of said holding current.

6. In a camera as defined in claim 5, said additional circuit means comprising means for thusly changing the voltage applied to said control electrode in response to and in dependence upon the assumption by said contact means of said activated state.

7. In a camera as defined in claim 5, said contact means and said additional circuit means being so interconnected with said controllable-impedance semiconductor element that said additional circuit means is operatively connected with said controllable-impedance semiconductor element when and only when said contact means is in said activated state.

8. In a camera as defined in claim 5, said contact means being connected in the current path of said film drive means and in the current path of said additional circuit means so that when said contact means is activated current can flow both through said film drive means and through said additional circuit means.

9. In a camera as defined in claim 5, said controllable-impedance element being a transistor whose base constitutes said control electrode, said coil of the relay means being connected in the emitter circuit of said transistor, said energizing circuit means comprising a resistor and an activating switch connecting the base of said transistor to the collector thereof, said additional circuit means comprising a zener diode having one terminal connected to said base, said contact means comprising a relay switch having one terminal connected to the other terminal of said zener diode and another terminal connected to the terminal of said coil not connected to said emitter.

10. In a motion picture camera having film, a source of electrical energy, film drive means for advancing said film, relay means having contact means connected to said film drive means and said source of electrical energy and a coil for operating said contact means to an activated state energizing said film drive means in response to a pull-in current flowing through said coil, the coil of said relay means requiring a holding current substantially less than said pull-in current to maintain said contact means in said activated state, energizing circuit means connected to said coil for furnishing said pull-in current to said coil upon external activation, and means operative in automatic response to and in dependence upon the assumption by said contact means of said activated state for reducing the current through said coil to said holding current.

* * * * *